United States Patent
Wang et al.

(10) Patent No.: US 10,330,849 B2
(45) Date of Patent: Jun. 25, 2019

(54) QUANTUM DOT FILM, METHOD FOR MANUFACTURING THE SAME AND BACKLIGHT MODULE

(71) Applicants: BOE TECHNOLOGY GROUP CO., LTD., Beijing (CN); ORDOS YUANSHENG OPTOELECTRONICS CO., LTD., Ordos (CN)

(72) Inventors: Bo Wang, Beijing (CN); Zhanjie Ma, Beijing (CN); Minghua Xuan, Beijing (CN)

(73) Assignees: BOE TECHNOLOGY GROUP CO., LTD., Beijing (CN); ORDOS YUANSHENG OPTOELECTRONICS Co., LTD., Ordos (CN)

( * ) Notice: Subject to any disclaimer, the term of this patent is extended or adjusted under 35 U.S.C. 154(b) by 218 days.

(21) Appl. No.: 15/147,392

(22) Filed: May 5, 2016

(65) Prior Publication Data
US 2017/0023720 A1   Jan. 26, 2017

(30) Foreign Application Priority Data

Jul. 21, 2015   (CN) .......................... 2015 1 0432291

(51) Int. Cl.
*F21V 8/00*   (2006.01)
*F21V 9/00*   (2018.01)
(Continued)

(52) U.S. Cl.
CPC ................ *G02B 6/005* (2013.01); *F21V 9/30* (2018.02); *F21V 9/32* (2018.02); *F21V 9/00* (2013.01);
(Continued)

(58) Field of Classification Search
CPC ......... G02B 6/005; G02B 6/0058; F21V 9/30; F21V 9/32; F21V 9/00
See application file for complete search history.

(56) References Cited

U.S. PATENT DOCUMENTS 5,200,858 A * 4/1993 Hagerty ................ C03B 23/203
                                                          359/652
6,972,147 B1 * 12/2005 Wei ........................ B32B 27/18
                                                          428/141
(Continued)

FOREIGN PATENT DOCUMENTS

CN   102954408 A   3/2013
CN   103887441 A   6/2014
(Continued)

OTHER PUBLICATIONS

First Office Action regarding Chinese Application No. 201510432291.6, dated Jun. 16, 2017. Translation provided by Dragon Intellectual Property Law Firm.
(Continued)

*Primary Examiner* — Alexander K Garlen
*Assistant Examiner* — Colin J Cattanach
(74) *Attorney, Agent, or Firm* — Harness, Dickey & Pierce, P.L.C.

(57) ABSTRACT

The present disclosure provides a quantum dot film, a method for manufacturing the same and a backlight module. The quantum dot film comprises a quantum dot layer and an optical waveguide layer, the quantum dot layer covers the optical waveguide layer, the optical waveguide layer is a laminated structure made up of a plurality of sublayers, and starting from the sublayer close to the quantum dot layer in the laminated structure, the refractive indices of sublayers become larger layer by layer. The backlight module comprises the above-mentioned quantum dot film, and the quan-
(Continued)

tum dot film is located between the optical waveguide layer and the prism film.

19 Claims, 3 Drawing Sheets

(51) Int. Cl.
*F21V 9/30* (2018.01)
*F21V 9/32* (2018.01)

(52) U.S. Cl.
CPC ............ *G02B 6/004* (2013.01); *G02B 6/0033* (2013.01); *G02B 6/0035* (2013.01); *G02B 6/0036* (2013.01); *G02B 6/0038* (2013.01); *G02B 6/0041* (2013.01); *G02B 6/0053* (2013.01)

(56) References Cited

U.S. PATENT DOCUMENTS

| | | | |
|---|---|---|---|
| 9,140,837 B2* | 9/2015 | Oh | G02B 5/0242 |
| 9,360,615 B1* | 6/2016 | Jalava | G02B 6/34 |
| 2002/0043931 A1* | 4/2002 | Minoura | H01J 1/70 |
| | | | 313/506 |
| 2002/0180910 A1* | 12/2002 | Umemoto | G02B 6/0036 |
| | | | 349/113 |
| 2007/0269586 A1* | 11/2007 | Leatherdale | H01L 33/58 |
| | | | 427/66 |
| 2011/0141769 A1 | 6/2011 | Lee et al. | |
| 2011/0228511 A1* | 9/2011 | Weber | G02B 5/305 |
| | | | 362/19 |
| 2012/0113672 A1* | 5/2012 | Dubrow | B82Y 20/00 |
| | | | 362/602 |
| 2012/0132944 A1* | 5/2012 | Hsieh | H01L 33/46 |
| | | | 257/98 |
| 2013/0050612 A1 | 2/2013 | Hur et al. | |
| 2013/0335677 A1 | 12/2013 | You | |
| 2014/0022819 A1 | 1/2014 | Oh et al. | |
| 2014/0029239 A1* | 1/2014 | Oh | G02B 5/0242 |
| | | | 362/84 |
| 2014/0140091 A1* | 5/2014 | Vasylyev | G02B 6/001 |
| | | | 362/606 |
| 2014/0168778 A1 | 6/2014 | Chen et al. | |
| 2015/0109814 A1* | 4/2015 | Chen | G02B 6/005 |
| | | | 362/606 |
| 2015/0279250 A1* | 10/2015 | McDaniel | G09F 13/16 |
| | | | 362/84 |
| 2016/0109635 A1* | 4/2016 | Lee | G02B 6/0026 |
| | | | 349/65 |
| 2016/0116663 A1* | 4/2016 | Hong | G02B 6/0053 |
| | | | 362/607 |
| 2017/0192146 A1* | 7/2017 | Yamada | G02B 6/005 |
| 2017/0242179 A1* | 8/2017 | Satake | G02B 6/005 |
| 2017/0248748 A1* | 8/2017 | Satake | G02B 6/0055 |
| 2017/0269285 A1* | 9/2017 | Hirayama | G02B 6/0061 |
| 2017/0321116 A1* | 11/2017 | Satake | G02B 5/12 |
| 2018/0046031 A1* | 2/2018 | Kamada | F21V 3/00 |
| 2018/0072949 A1* | 3/2018 | Satake | G02B 5/20 |
| 2018/0079868 A1* | 3/2018 | Yamada | C08G 77/388 |
| 2018/0081236 A1* | 3/2018 | Chikushi | C09K 11/08 |

FOREIGN PATENT DOCUMENTS

| | | |
|---|---|---|
| CN | 103955093 A | 7/2014 |
| CN | 203771205 U | 8/2014 |
| CN | 104566015 A | 4/2015 |
| CN | 204439978 U | 7/2015 |
| TW | 201241536 A | 10/2012 |

OTHER PUBLICATIONS

Third Chinese Office Action regarding Application No. 201510432291.6 dated Jul. 3, 2018. Translation provided by Dragon Intellectual Property Law Firm.

\* cited by examiner

QUANTUM DOT FILM, METHOD FOR MANUFACTURING THE SAME AND BACKLIGHT MODULE

CROSS-REFERENCE TO RELATED APPLICATION

The present application claims priority to the Chinese patent Application No. 201510432291.6 filed in China on Jul. 21, 2015, the entire contents of which are incorporated by reference.

FIELD OF THE INVENTION

The present disclosure relates to the field of Liquid Crystal Display, and in particular, to a quantum dot film, a method for manufacturing the same and a backlight module.

BACKGROUND

A backlight source is a light source that is disposed in the back of a Liquid Crystal Display, which has an important impact on the display effect of the Liquid Crystal Display. According to the different light sources employed by the backlight source, the backlight source can be divided into Electroluminescent Light, cold Cathode Fluorescent Lamp (CCFL) and Light Emitting Diode (LED) light source. According to the different installation position of the light source, the backlight source can also be divided into an edge-lighting type and direct-lighting type.

The traditional edge-lighting type LED backlight source mainly includes a LED, a light guide plate, a quantum dot film and a prism film. LED is located at one side of the light guide plate, the quantum dot film is sandwiched between the light guide plate and the prism film. Light emitted by a LED changes the emitting direction by passing through the light guide plate, and then passes through the quantum dot film and the prism film to emit. The role of the quantum dot film is to provide quantum dots, the quantum dots can emit light upon excitation with light emitted by the LED. Light emitted by quantum dots and the LED can form white light after mixing, thereby enhancing the display effect of a Liquid Crystal Display.

The inventors found the following technical problems existed in the prior arts during the process of achieving the present disclosure.

When light emitted by a LED is incident on a quantum dot film in a vertical direction after passing through a light guide plate, the optical path of the light is the shortest in the quantum dot film; Light will excite a certain number of quantum dots to emit light. While when light emitted by a LED is incident on a quantum dot film in a non-vertical direction after passing through a light guide plate, especially in the direction deviating relatively far from the vertical direction, the optical path of the light is relatively long in the quantum dot film, light will excite relatively more quantum dots to emit light. Then the color gamut of the picture displayed by a Liquid Crystal Display is smaller than the color gamut of the picture displayed when light is incident on the quantum dot film in the vertical direction, and the phenomenon of the color deviation of the wide viewing angle occurs.

SUMMARY

The present disclosure provides a quantum dot film, a method for manufacturing the same and a backlight module, thereby solving the problem of the color deviation of the wide viewing angle of the quantum dot film. The technical solutions of the present disclosure are as follows.

According to the first aspect of the present disclosure, a quantum dot film is provided, the quantum dot film includes a quantum dot layer, wherein said quantum dot film also includes an optical wave guide layer, said quantum dot layer covers the optical wave guide layer, said optical wave guide layer is a laminated structure made up of a plurality of sublayers, and starting from the sublayer close to said quantum dot film layer in the laminated structure, the refractive indices of sublayer becomes smaller layer by layer.

According to the first embodiment of the first aspect of the present disclosure, the refractive index difference between the two adjacent sublayers is 0.01-0.05.

According to the second embodiment of the first aspect of the present disclosure, the refractive index of each of the sublayers is 1.2-1.7.

According to the third embodiment of the first aspect of the present disclosure, the sublayers are SiON layers or TiSiO layers.

According to the fourth embodiment of the first aspect of the present disclosure, the number of the sublayers is 3-10.

According to the fifth embodiment of the first aspect of the present disclosure, the thickness of the optical waveguide layer is 100 μm-200 μm.

According to the sixth embodiment of the first aspect of the present disclosure, the quantum dot film further includes a retroreflective prism film, the optical waveguide layer is located between the retroreflective prism film and the quantum dot layer.

According to the seventh embodiment of the first aspect of the present disclosure, the thickness of the quantum dot layer is 50 μm-200 μm.

According to the second aspect of the present disclosure, a method for manufacturing a quantum dot film is provided, the method comprises:

manufacturing an optical waveguide layer;

providing a quantum dot layer, and joining the quantum dot layer and the optical waveguide layer together to form a quantum dot film;

wherein the optical wave guide layer is a laminated structure made up of a plurality of sublayers, and starting from the sublayer close to the quantum dot layer in the laminated structure, the refractive indices of sublayers become smaller layer by layer.

According to the third aspect of the present disclosure, a backlight module is provided, the backlight module includes a light guide plate, a quantum dot film, and a prism film, and the quantum dot film is sandwiched between the light guide plate and the prism film.

The quantum dot film is the above-mentioned quantum dot film, the quantum dot layer is located between the optical waveguide layer and the prism film.

According to the first embodiment of the third aspect of the present disclosure, the thickness of the backlight module is about 1.2 mm.

The technical solutions according to the present disclosure produce the following beneficial technical effects:

Starting from the sublayer close to the quantum dot layer in the laminated structure, the refractive index of sublayers is set as becoming smaller layer by layer. When an optical waveguide layer is located between a light guide plate and a quantum dot film, and light passing through the light guide plate is incident on the optical waveguide layer in the direction deviating relatively far from the vertical direction, employing the principle of light refraction, the optical waveguide layer will correct the incident angle of light, making the incident angle of light gradually approaching toward the direction perpendicular to the quantum dot layer. Therefore, when a Liquid Crystal Display employs the quantum dot film provided by the present disclosure or the backlight module including the quantum dot film, light is eventually incident on the quantum dot layer in the direction close to the direction perpendicular to the quantum dot layer, and passes through the quantum dot layer in a shorter optical path, thereby enhancing the color gamut, and improving the problem of the color deviation of the wide view angle of the Liquid Crystal Display to a certain extent.

BRIEF DESCRIPTION OF THE DRAWINGS

In order to illustrate the technical solutions of the embodiments in the present disclosure more clearly, a brief introduction to the drawings described in the embodiments will be given. Obviously, the drawings described below are only some of the embodiments in the present disclosure, for one of ordinary skills in the art, other drawing can be made upon these drawings without paying creative work.

DETAILED DESCRIPTION

In order to make the purpose, technical solutions and advantages of the present disclosure more clear, the embodiments of the present disclosure will be further described in conjunction with the drawings.

Figure 1:
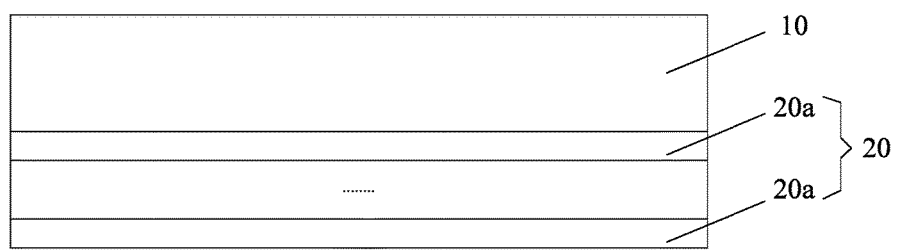
FIG. 1 is a structural representation of a quantum dot film provided by one embodiment according to the present disclosure.

FIG. 1 shows a quantum dot film provided by one embodiment according to the present disclosure. The quantum dot film in FIG. 1 includes a quantum dot layer 10 and an optical waveguide layer 20, the quantum dot layer 10 covers the optical waveguide layer 20, the optical waveguide layer 20 is a laminated structure made up of a plurality of sublayers 20a. Starting from the sublayer 20a close to the quantum dot layer 10 in the laminated structure, the refractive indices of sublayers 20a become smaller layer by layer.

Figure 2:
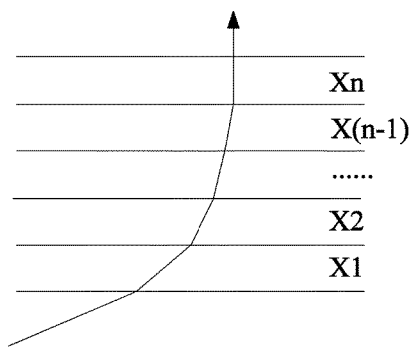
FIG. 2 is a light propagation path diagram of the incident light in the optical waveguide layer provided by one embodiment according to the present disclosure.

Supposing an optical waveguide layer 20 is a laminated structure made up of n sublayers 20a, n is a positive whole number that is greater than or equal to 2. Starting from the sublayer 20a close to the quantum dot layer 10, the refractive index of n sublayers 20a is successively Xn, X(n−1), . . . , X2 and X1, and Xn>X(n−1)> . . . >X2>X1. Referring to FIG. 2, when light is incident in a large angle on the sublayer having a refractive index of X1, light is first refracted at a certain angle in the sublayer 20a having a refractive index of X1, then is incident into the sublayer 20a having a refractive index of X2, then is refracted again at a certain angle in the sublayer X2 having a refractive index of X2, then is incident into the sublayer 20a having a refractive index of X3. Due to X2>X1, the incident angle when the light is incident into the sublayer 20a having a refractive index of X3 is more close to 90° C. than the incident angle when the light is incident into the sublayer 20a having a refractive index of X2. And so on, when the light successively pass through the left sublayers 20a, the incident angle of light will gradually approach 90° C., finally when light is emitted from the sublayer 20a having a refractive index of Xn, the emission angle of light is almost close to 90° C., that is, light will be incident on the quantum dot layer 10 in an approximately vertical direction.

Starting from the sublayer close to the quantum dot layer in the laminated structure, the refractive index of sublayers becomes smaller layer by layer, when an optical waveguide layer is located between a light guide plate and a quantum dot film, and light passing through the light guide plate is incident on the optical waveguide layer in the direction deviating relatively far from the vertical direction, employing the principle of light refraction, the optical waveguide layer will correct the incident angle of light, making the incident angle of light gradually approaching toward the direction perpendicular to the quantum dot layer. Therefore, when a Liquid Crystal Display employs the quantum dot film provided by the present disclosure or the backlight module including the quantum dot film, light is eventually incident on the quantum dot layer in the direction which is close to the direction perpendicular to the quantum dot layer, and pass through the quantum dot layer in a shorter optical path, thereby enhancing the color gamut and improving the problem of the color deviation of the wide view angle of the Liquid Crystal Display to a certain extent.

Figure 3:
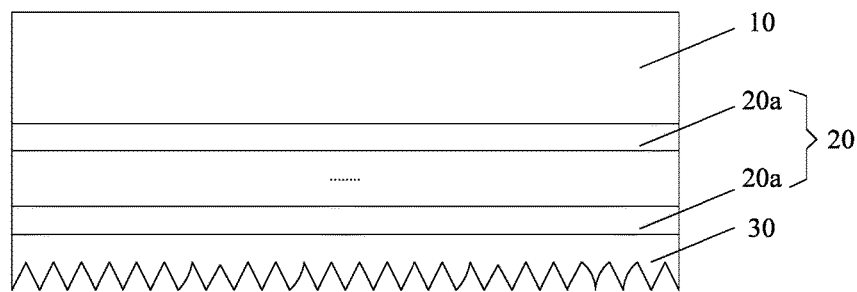
FIG. 3 is a structural representation of a quantum dot film provided by another embodiment according to the present disclosure.

FIG. 3 shows a quantum dot film provided by another embodiment of the present disclosure. As compared to the quantum dot film as shown in FIG. 1, the quantum dot film as shown in FIG. 3 not only includes a quantum dot layer 10 and an optical wave guide layer 20, but also includes a retroreflective prism film 30.

Firstly the structure of the optical waveguide layer 20 will be described in detail as follows.

In the first embodiment, sublayers 20a may be SiON layers. The SiON layers can grow by employing Plasma Enhanced Chemical Vapor Deposition (PEVCD), and growth gas may be a mixture of $SiH_4$, $N_2O$ and $NH_3$.

In the second embodiment, sublayers 20a may be TiSiO layers. The TiSiO layers may also grow by employing PEVCD, and growth gas may be a mixture of $TiCl_4$, $SiCl_4$ and $O_2$.

In the above-mentioned two embodiments, it is possible to achieve the effect of changing the refractive index of sublayers 20a through changing the ration of the growth gas during the process of the growth of sublayers 20a, thereby obtaining an optical waveguide layer 20.

It should be noted that besides SiON and TiSiO layers, sublayers 20a may also be other semiconductor thin film layers of good optical and thermal performance, the present disclosure is not so limited.

As an alternative embodiment, the refractive index difference between the two adjacent sublayers 20a may be 0.01-0.05. As a further alternative embodiment, the refractive index difference between the two adjacent sublayers 20a may be 0.02. The experiments prove that the effect of the incident angle of the corrected light is better when the refractive index difference between the two adjacent sublayers 20a is 0.02.

As an alternative embodiment, the refractive index of each sublayer 20a may be 1.2-1.7. As a further alternative embodiment, the refractive index of each sublayer 20a may be 1.45-1.55. The experiments prove that the effect of the incident angle of the corrected light is better when the refractive index of each sublayer 20a is 1.45-1.55.

As an alternative embodiment, the number of the sublayers 20a included in a laminated structure may be 3-10. As a further alternative embodiment, the number of the sublayers 20a included in the laminated structure may be 8. The experiments prove that the effect of the incident angle of the corrected light is better when the number of the sublayers 20a is 8.

As an alternative embodiment, the thickness of an optical waveguide layer 20 may be 100 μm-200 μm. As a further alternative embodiment, the thickness of an optical waveguide layer 20 may be 150 μm. The experiments prove that the effect of the incident angle of the corrected light is better when the thickness of an optical waveguide layer 20 is 150 μm.

As an alternative embodiment, the thickness of a quantum dot layer 10 may be 50 μm-200 μm. As a further alternative embodiment, the thickness of a quantum dot layer 10 may be 100 μm.

A quantum dot layer 10 includes a matrix and a plurality of quantum dots uniformly distributing in the matrix. Materials of the matrix may be acrylic resin, organosiloxane resin, acrylic-modified polyurethane, acrylic-modified organosilicone resin or epoxy resin. Materials of the quantum dot may be any of the chemical compounds (the first chemical compounds) formed by the elements in the main group II and main group VI, may also be any of the chemical compounds (the second chemical compounds) formed by the elements in the main group III and main group V, may also be a core-shell structure formed by multiple cladding core materials among the first chemical compounds and/or the second chemical compounds or a doped nanocrystalline of the first chemical compounds and/or the second chemical compounds. The first chemical compounds include CdSe, CdTe, MgS, MgSe, MgTe, CaS, CaSe, CaTe, SrS, SrSe, SrTe, BaS, BaSe, BaTe, ZnS, ZnSe, ZnTe and CdS, the second chemical compounds include GaN, GaP, GaAs, InN, InP and InAs.

It should be noted that the structure and materials of the above-mentioned quantum dot layer 10 are only examples, in the present disclosure, there are no limitations on the structure and materials of the quantum dot layer 10, the structure and materials of the quantum dot layer 10 may be any of the structure and materials of quantum dot layer provided by the prior art.

Referring to FIG. 3, the quantum dot film further includes a retroreflective prism film 30, and the optical waveguide layer 20 is located between the retroreflective prism film 30 and the quantum dot layer 10. The surface of the retroreflective prism film 30 is covered with an optical waveguide layer 20, the bottom of the retroreflective prism film 30 is set to have a plurality of protrusions, the protrusions may be a stripe prismatic structure, also may be granular protrusions. The surface of the protrusions may be an irregular polygon.

Part of the light whose incident angle is not ideal will be totally reflected by an optical waveguide layer 20, then strike the retroreflective prism film 30. The retroreflective prism film 30 may reflect the light stroke on the retroreflective prism film 30 back to the optical waveguide layer 20 through the protrusions, the optical waveguide layer 20 correct the incident angle of light, eventually achieving the effect of emission in the direction perpendicular to a quantum dot layer 10.

Materials of the retroreflective prism film 30 may be Polyethylene Terephthalate (PET), may also be any of the prism film materials provided by the prior art. There are no limitations on the materials of the retroreflective prism film 30 in the present disclosure.

Figure 4:
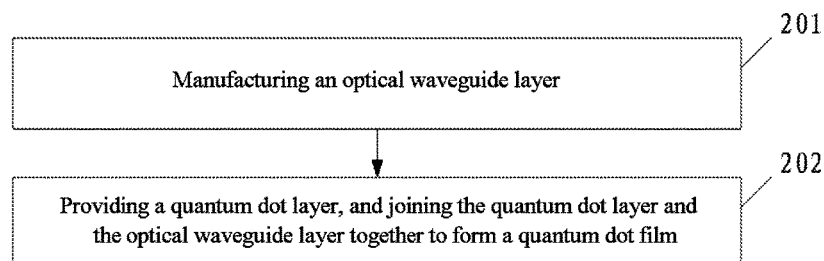
FIG. 4 is a flow chart of the method for manufacturing a quantum dot film provided by one embodiment according to the present disclosure.

FIG. 4 shows a method for manufacturing a quantum dot film provided by one embodiment according to the present disclosure. The method is adapt to manufacture the quantum dot film as shown in FIG. 1 or FIG. 3. Referring to FIG. 4, the manufacturing method including:

Step 201: manufacturing an optical waveguide layer; and
Step 202: Providing a quantum dot layer, and joining the quantum dot layer and the optical waveguide layer together to form a quantum dot film;

In step 201, the optical waveguide layer is a laminated structure made up of a plurality of sublayers. According to the growth order of sublayers, the refractive index of sublayers may become smaller layer by layer, also may become larger layer by layer. To be specific, PECVD may be employed to grow an optical waveguide layer. Starting from the sublayer close to a quantum dot layer in the laminated structure, the refractive index of a plurality of sublayers becomes smaller layer by layer.

In step 202, the growth method of a quantum dot layer may be Metal-organic Chemical Vapor Deposition (MOCVD), or Molecular Beam epitaxy (MBE), also may be a growth method of any quantum dot layer provided by the prior art. In the present disclosure, there is no limitation on the growth method of the quantum dot layer.

In the embodiments of the present disclosure, starting from the sublayer close to the quantum dot layer in the laminated structure, the refractive index of sublayers becomes smaller layer by layer, when an optical waveguide layer is located between a light guide plate and a quantum dot film, and light passing through the light guide plate is incident on the optical waveguide layer in the direction deviating relatively far from the vertical direction, employing the principle of light refraction, the optical waveguide layer will correct the incident angle of light, making the incident angle of light gradually approaching toward the direction perpendicular to the quantum dot layer. Therefore, when a Liquid Crystal Display employs the quantum dot film provided by the present disclosure or the backlight module including the quantum dot film, light is eventually incident on the quantum dot layer in the direction close to the direction perpendicular to the quantum dot layer, and pass through the quantum dot layer in a shorter optical path, thereby enhancing the color gamut and improving the problem of the color deviation of the wide view angle of the Liquid Crystal Display to a certain extent.

Figure 5:
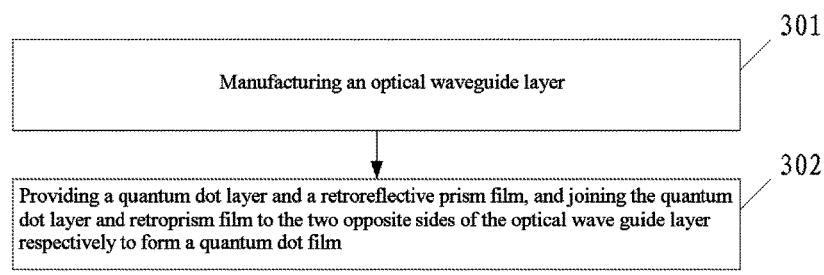
FIG. 5 is a flow chart of the method for manufacturing a quantum dot film provided by another embodiment according to the present disclosure.

FIG. 5 shows a method for manufacturing a quantum dot film provided by another embodiment in the present disclosure. The method is adapted to manufacture the quantum dot film as shown in FIG. 3. Referring to FIG. 5, the manufacturing method including:

Step 301: manufacturing an optical waveguide layer; and
Step 302: providing a quantum dot layer and a retroreflective prism film, and joining the quantum dot layer and retroreflective prism film to the two opposite sides of the optical waveguide layer respectively to forming a quantum dot film.

Referring to steps 201, 202 as shown in FIG. 4 for the growth method of an optical waveguide layer, no more tautology here. Starting from the sublayer close to a quantum dot layer in the laminated structure of an optical waveguide layer, the refractive index of a plurality of sublayers becomes smaller layer by layer.

In the embodiments of the present disclosure, starting from the sublayer close to the quantum dot layer in the laminated structure, the refractive index of sublayers becomes smaller layer by layer, when an optical waveguide layer is located between a light guide plate and a quantum dot film, and light passing through the light guide plate is incident on the optical waveguide layer in the direction deviating relatively far from the vertical direction, employing the principle of light refraction, the optical waveguide layer will correct the incident angle of light, making the incident angle of light gradually approaching toward the direction perpendicular to the quantum dot layer. Therefore, when a Liquid Crystal Display employs the quantum dot film provided by the present disclosure or the backlight module including the quantum dot film, light is eventually incident on the quantum dot layer in the direction close to the direction perpendicular to the quantum dot layer, and pass through the quantum dot layer in a shorter optical path, thereby enhancing the color gamut and improving the problem of the color deviation of the wide view angle of the Liquid Crystal Display to a certain extent.

Figure 6:
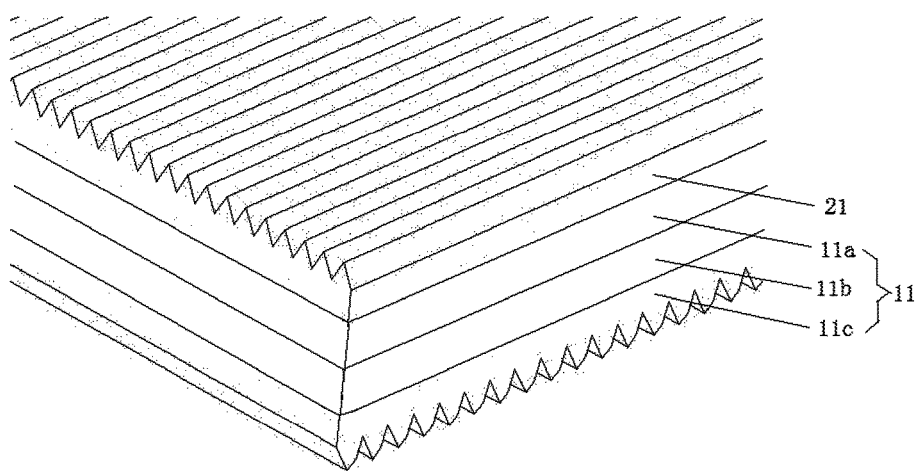
FIG. 6 is a structural representation of a backlight module provided by one embodiment according to the present disclosure.

FIG. 6 shows a backlight module provided by one embodiment according to the present disclosure. The backlight module applies to a LED backlight source, in particular to an edge-lighting LED backlight source. Referring to FIG. 6, the backlight module includes a light guide plate (not shown in Figs.), a quantum dot film 11, and a prism film 21. The quantum dot film is sandwiched between the light guide plate and prism film 21.

The quantum dot film 11 includes a quantum dot layer 11a and an optical waveguide layer 11b. The quantum dot layer 11a covers the optical waveguide layer 11b, the optical way guide layer 11b is a laminated structure made up of a plurality of sublayers. Starting from the sublayer close to the quantum dot layer 11a in the laminated structure, the refractive index of a sublayer becomes smaller layer by layer. The quantum dot layer 11a is located between the optical waveguide layer 11b and the prism film 21. The quantum dot film 11 may be the quantum dot film as shown in FIG. 1. The quantum dot firm 11 also includes a retroreflective prism film 11c. The optical waveguide layer 11b is located between the quantum dot layer 11a and retroreflective prism film 11c. The quantum dot film 11 may also be the quantum dot film as shown in FIG. 3.

In the present embodiments, there are no limitations on the light guide plate and the prism film 21, the light guide plate and prism film 21 may employ any of the light guide plates and prism films provided by the prior art respectively.

As an alternative embodiment, the thickness of a backlight module is 0.5-2.0 mm, further alternatively 1.2 mm.

There is no obvious increase in the thickness of the whole backlight module after adding an optical waveguide layer, thereby applying to a thin backlight module.

In the embodiments of the present disclosure, starting from the sublayer close to the quantum dot layer in the laminated structure, the refractive index of sublayers becomes smaller layer by layer, when an optical waveguide layer is located between a light guide plate and a quantum dot film, and light passing through the light guide plate is incident on the optical waveguide layer in the direction deviating relatively far from the vertical direction, employing the principle of light refraction, the optical waveguide layer will correct the incident angle of light, making the incident angle of light gradually approaching toward the direction perpendicular to the quantum dot layer. Therefore, when a Liquid Crystal Display employs the quantum dot film provided by the present disclosure or the backlight module including the quantum dot film, light is eventually incident on the quantum dot layer in the direction close to the direction perpendicular to the quantum dot layer, and pass through the quantum dot layer in a shorter optical path, thereby enhancing the color gamut and improving the problem of the color deviation of the wide view angle of the Liquid Crystal Display to a certain extent.

The No. of the above-mentioned embodiments of the present disclosure is only used for description, not for representing the Pros and cons of the embodiments.

The above descriptions are only alternative embodiments of the present disclosure, not used for the limitation of the present disclosure. Any modifications, equivalents and improvements made within the spirit and principle of the present disclosure should be included within the protection scope of the present disclosure.

What is claimed is:

1. A quantum dot film which comprises a quantum dot layer, an optical waveguide layer, and a retroreflective prism film, wherein the optical waveguide layer is located between and in direct contact with each of the retroreflective prism film and the quantum dot layer, the optical waveguide layer is a laminated structure made up of a plurality of sublayers, and starting from the sublayer close to the quantum dot layer in the laminated structure, refractive indices of the sublayers become smaller layer by layer, and wherein the retroreflective prism film comprises a top surface and a bottom surface, the bottom surface has a plurality of protrusions and the top surface contacts the optical waveguide layer.

2. The quantum dot film according to claim 1, wherein, a refractive index difference of the two adjacent sublayers is in the range of 0.01 to 0.05.

3. The quantum dot film according to claim 1, wherein, the refractive index of each of the sublayers is from 1.2 to 1.7.

4. The quantum dot film according to claim 1, wherein, the sublayers are SiON layers or TiSiO layers.

5. The quantum dot film according to claim 1, wherein, the number of the sublayers is in the range of 3 to 10.

6. The quantum dot film according to claim 1, wherein, a thickness of the optical waveguide layer is in the range of 100 µm to 200 µm.

7. The backlight module according to claim 1, wherein the protrusions collectively define a stripe prismatic structure, or the protrusions comprise granular protrusions.

8. The quantum dot film according to claim 1, wherein, a thickness of the quantum dot layer is in the range of 50 µm to 200 µm.

9. A method for manufacturing a quantum dot film, comprising: manufacturing an optical waveguide layer; and providing a quantum dot layer and a retroreflective prism film, and joining the quantum dot layer, the retroreflective prism film, and the optical waveguide layer together to form a quantum dot film; wherein the optical waveguide layer is located between and in direct contact with each of the retroreflective prism film and the quantum dot layer, and wherein the optical waveguide layer is a laminated structure made up of a plurality of sublayers, and starting from the sublayer close to the quantum dot layer in the laminated structure, refractive indices of the sublayers become smaller layer by layer, and wherein the retroreflective prism film comprises a top surface and a bottom surface, the bottom surface has a plurality of protrusions and the top surface contacts the optical waveguide layer.

10. The method according to claim 9, wherein, a refractive index difference between the two adjacent sublayers is in the range of 0.01 to 0.05.

11. The method according to claim 9, wherein, the sublayers are SiON layers or TiSiO layers.

12. A backlight module comprising a light guide plate, a quantum dot film, and a prism film, the quantum dot film is sandwiched between the light guide plate and the prism film, wherein the quantum dot film comprises a quantum dot layer, an optical waveguide layer, and a retroreflective prism film, wherein the optical waveguide layer is located between the retroreflective prism film and the quantum dot layer, the optical waveguide layer is a laminated structure made up of a plurality of sublayers, and starting from the sublayer close to the quantum dot layer in the laminated structure, refractive indices of the sublayers become smaller layer by layer, and the quantum dot layer is located between the optical waveguide layer and the prism film, and wherein the retroreflective prism film comprises a top surface and a bottom surface, the bottom surface has a plurality of protrusions and the top surface contacts the optical waveguide layer.

13. The backlight module according to claim 12, wherein, a thickness of the backlight module is 1.2 mm.

14. The backlight module according to claim 12, wherein, a refractive index difference between the two adjacent sublayers is in the range of 0.01 to 0.05.

15. The backlight module according to claim 12, wherein, the refractive index of each of the sublayers is in the range of 1.2 to 1.7.

16. The backlight module according to claim 12, wherein, the sublayers are SiON layers or TiSiO layers.

17. The backlight module according to claim 12, wherein, the number of the sublayers is in the range of 3 to 10.

18. The backlight module according to claim 12, wherein, a thickness of the optical waveguide layer is in the range of 100 μm to 200 μm.

19. The backlight module according to claim 12, wherein, a thickness of the quantum dot layer is in the range of 50 μm to 200 μm.

* * * * *